(12) United States Patent
Ketchmark

(10) Patent No.: US 6,685,405 B2
(45) Date of Patent: Feb. 3, 2004

(54) TRANSPORTABLE UNIT FOR EARTHWORKING IMPLEMENTS

(76) Inventor: Patrick Ketchmark, 651 4th Ave., East Brooks, Alberta (CA), T1R0H4

( * ) Notice: Subject to any disclaimer, the term of this patent is extended or adjusted under 35 U.S.C. 154(b) by 15 days.

(21) Appl. No.: 10/018,934

(22) PCT Filed: Apr. 12, 2001

(86) PCT No.: PCT/CA01/00526
§ 371 (c)(1),
(2), (4) Date: Dec. 19, 2001

(87) PCT Pub. No.: WO01/81683
PCT Pub. Date: Nov. 1, 2001

(65) Prior Publication Data
US 2002/0159855 A1 Oct. 31, 2002

(30) Foreign Application Priority Data
Apr. 20, 2000 (CA) .............................................. 2306424

(51) Int. Cl.⁷ .................................................. B60P 7/08
(52) U.S. Cl. .............................. 410/43; 410/31; 410/46
(58) Field of Search .............................. 410/43, 31, 32, 410/33, 46, 89; 211/13.1, 71.01, 85.18; 224/404, 522

(56) References Cited

U.S. PATENT DOCUMENTS

| | | | | | |
|---|---|---|---|---|---|
| 1,750,128 | A | * | 3/1930 | Romine | .......................... 410/2 |
| 2,428,893 | A | * | 10/1947 | Procissi | ........................ 410/31 |
| 2,593,472 | A | * | 4/1952 | McGinn | |
| 3,355,029 | A | * | 11/1967 | Eurey | |
| 3,519,140 | A | * | 7/1970 | Wellman, Jr. | |
| 3,543,951 | A | * | 12/1970 | Marvin | |
| 3,659,892 | A | * | 5/1972 | Briggs | .......................... 410/46 |
| 5,344,266 | A | * | 9/1994 | Kolb | ............................ 410/26 |
| 5,378,093 | A | * | 1/1995 | Schroeder | ..................... 410/32 |
| 5,582,495 | A | * | 12/1996 | Schroeder | ..................... 410/32 |
| 5,876,165 | A | * | 3/1999 | Campbell | ..................... 410/43 |
| 6,146,068 | A | * | 11/2000 | Schroeder | ..................... 410/35 |
| 6,497,542 | B1 | * | 12/2002 | Vermeulen | ................... 410/43 |

FOREIGN PATENT DOCUMENTS

| | | | | |
|---|---|---|---|---|
| DE | 2805783 | A | * 8/1979 | |
| DE | 9106734 | U | * 10/1991 | |
| FR | 2716176 | A | * 8/1995 | |
| IT | 360144 | B | * 10/1938 | .................. 224/522 |

* cited by examiner

Primary Examiner—Stephen T. Gordon
(74) Attorney, Agent, or Firm—Spencer Fane Britt & Browne LLP

(57) ABSTRACT

There is disclosed a movable and transportable unit for carrying tools or implements for different types of equipment used at different locations. The unit is mountable and removable from a trailer bed, so that the trailer can be used for other purposes. The transportation unit has upper and lower mounting surfaces separate by a frame, and where at least one side of the unit is relatively open to permit loading and unloading of implements or tools onto the surfaces or in retainers associated with the unit.

4 Claims, 7 Drawing Sheets

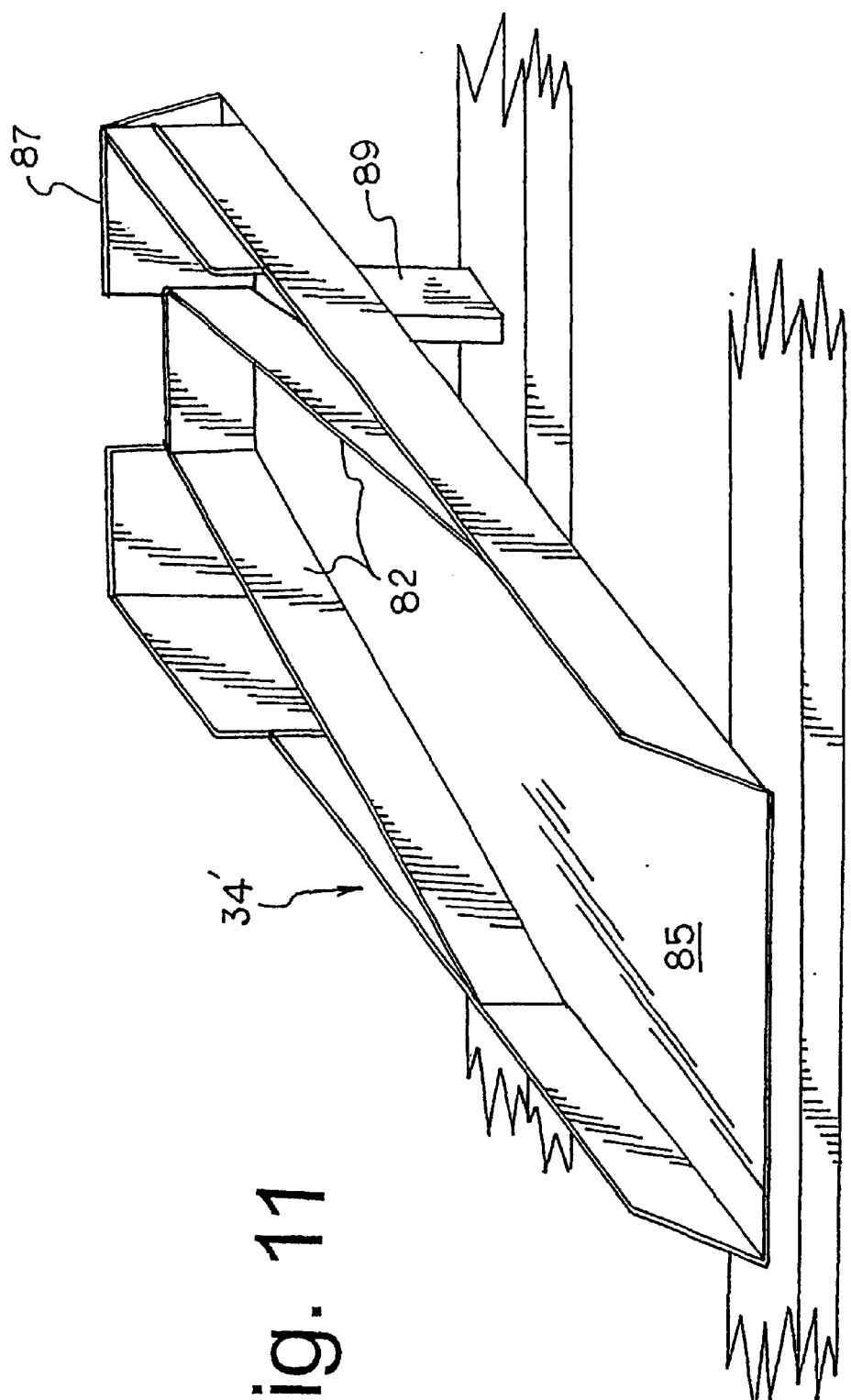

TRANSPORTABLE UNIT FOR EARTHWORKING IMPLEMENTS

FIELD OF THE INVENTION

This invention relates to a method for transporting loose equipment such as augers, buckets and other equipment for construction or the like. The invention also relates to a unit which is transportable by trailer or truck for carrying such equipment.

More particularly, this invention relates, in one aspect, to a transportable unit which may be mounted onto flatbed trailers to enable transportation of equipment and apparatus from a first location to a second remote location. In another embodiment of this aspect, this invention also relates to a trailer having or incorporating a transportable unit capable of transporting equipment from a first location such as a storage location, to a second location where such equipment may be used temporarily.

In another aspect, this invention relates to a method of transporting equipment from a first location, such as a storage location for the equipment, to a second location at which the equipment is to be used.

BACKGROUND OF THE INVENTION

Where equipment is required to be moved from one location to another, specialized trucks or hauling equipment are often employed for the purpose of transporting such equipment from, for example, a storage location to a site where the equipment is to be used. After usage, the equipment is normally returned to a storage site or transported to another use site. Typically, it is desired to haul equipment such as augers, backhoe buckets, machine-operated brushes, hand tools such as shovels, forklift fork members and potentially a variety of other equipment. Typical building and construction contractors must load a variety of equipment on board at the start of each work day to be able to respond to expected and unexpected work requirements.

For contractors in the building and construction industry, the use of specialized equipment such as specialized trailers is a relatively costly expedient to move equipment from one job site to another, or from the contractors place of business to a job site. Specialized trailers can be built for hauling particular items of equipment, such as that used for diggers, Bobcats (tm), backhoes, etc. The trailer can either be specially configured (structured) to carry that particular type of equipment or, the equipment may be merely loaded onto a flatbed type trailer and secured by appropriate means to the trailer. Trailers which are specially configured for certain types of equipment are normally custom manufactured and are relatively expensive. On one hand, they have the advantage of the trailer being specifically configured to load and haul the equipment but on the other hand, they are restrictive for multi-use purposes when different types of equipment may be required to be transported from one site to another. Such custom built equipment has also the disadvantage that it basically can only be used for a single purpose-i.e. haulage of specific equipment for which the trailer was designed for.

Conventional flatbed trailers, on the other hand, merely consist of a wheeled trailer body and as the term implies, a bed for the trailer which is generally planar in nature. When equipment is required to be transported, it is merely loaded onto the bed, and secured by appropriate restraining means such as rope, chain or the like. Although more economical than a custom built trailer, these multi-use flatbed trailers have a restriction in the sense that individual pieces of equipment must be located in a random fashion and secured by suitable means. Such trailers, which are usual in the transportation industry for hauling equipment, normally only have a single flat bed surface. As such, carrying capacity is somewhat limited relative to a multi-platform trailer. Conventional flatbed trucks are also able to carry only a limited number of tools when the tools are simply placed willy-nilly on the bed. This is a particular restriction on contractors who work on several job sites over the course of the day, and often do not even know at the beginning of the day what tools they will need. For these workers, it is desirable to provide a means to conveniently carry a full complement of tools and small loose equipment on a conventional flatbed truck, while still leaving room for a Bobcat (tm) or other small power shovel or the like.

SUMMARY OF THE INVENTION

The present invention is directed to employment of conventional trailer units in which the trailer may mount a one piece transportation assembly for transporting equipment. The transportation assembly, including all tools carried by the assembly, can be readily and easily mounted on and removed from the bed of such a conventional trailer unit. In one aspect, the invention is a one piece transportation unit of the type which is adapted for mounting on a conventional trailer bed to permit transportation of equipment and implements comprising a monolithic frame. The invention is characterized by the frame comprising spaced apart upper and lower equipment mounting surfaces. The frame has pairs of opposed sides, one pair of sides defining lateral sides for the unit the other pair forming front and back sides. The frame has supporting members for positioning the upper surface in a spaced apart relationship relative to the lower surface. At least one side of the pairs of sides has an access opening between the upper and lower surfaces to permit loading of equipment onto the upper or lower surfaces. A plurality of spaced apart implement retainers is supported by and mounted to the frame members.

Desirably, the supporting members comprise a plurality of vertical frame members. The frame also has horizontal frame members and at least some of the spaced apart implement retainers are mounted by at least one of the vertical or horizontal frame members between the upper and lower surfaces. In another preferred embodiment, the unit includes at least two load supporting surfaces in an upper and lower planar relationship, the upper surface being spaced from the lower surface by a distance sufficient to permit loading of transportable apparatus on the lowermost surface.

In other preferred embodiments, the upper surface is mounted in a spaced apart relationship to the lower surface by a plurality of peripheral spaced apart frame members, the upper surface having substantially open lateral sides whereby transportable apparatus may be loaded on at least the upper surface. Preferably each of the surfaces includes retaining means for releasably retaining transportable equipment mounted on the surfaces.

The unit preferably includes a plurality of tool carriers specifically adapted to carry a particular tool. These include troughs to carry augers, platforms shaped to carry a specific size of bucket and tubes for holding brooms, forklift fork tines or other tools. Specific fasteners may be provided to hold the implements within the carriers, such as turnbuckle cables to hold forklift fork tines which may fasten to the truck bed.

Desirably, in this embodiment of the invention, the implement retainers comprise a plurality of retaining means mounted in spaced apart relationship on said unit, each retainer means being adapted to retain separate implements. These can include retainers specifically adapted to hold augers, fork lift members, buckets and brooms. The implement retainers may comprise elongated mounting plates angularly displaced relative to the plane of the lower platform.

In another preferred embodiment of the invention, the unit includes means for releasably securing the unit to a trailer. The upper surface may also comprise a plurality of horizontal longitudinal and transverse frame members forming an upper open supporting surface. Preferably the lower surface comprises a plurality of horizontal positioned longitudinal and transverse frame members forming a lower open supporting surface.

Another embodiment of the invention comprises in combination a trailer assembly comprising a wheeled trailer together with a transportable equipment caddy as described above.

A still further embodiment of the invention is a method of transporting equipment from a storage site to a remote location, comprising in general the steps of (1) providing a transportation unit as characterized above mountable on a conventional trailer bed, (2) mounting and securing of the unit on a wheeled trailer bed at the first site, (3) loading equipment onto at least one of the upper and lower mounting surfaces either before or after the unit is mounted on the trailer bed, and (4) transporting the equipment on the unit to the remote location.

In a further aspect, the unit is mounted onto a trailer bed by means of a fork lift which is then carried to the remote location. In a still further aspect, each tool carried by the unit is placed within an individual trough, carrier or retainer specifically shaped to hold the tool. At least some of the tools are retained during carriage by tiedowns or other fastening means.

Having thus generally described the invention, reference will now be made to preferred embodiments described by reference to the accompanying drawings.

BRIEF DESCRIPTION OF THE DRAWINGS

FIG. 11 is a perspective view of a portion of the apparatus shown in FIGS. 9 and 10, namely a tool retainer.

DETAILED DESCRIPTION OF THE PREFERRED EMBODIMENTS

Figure 1:
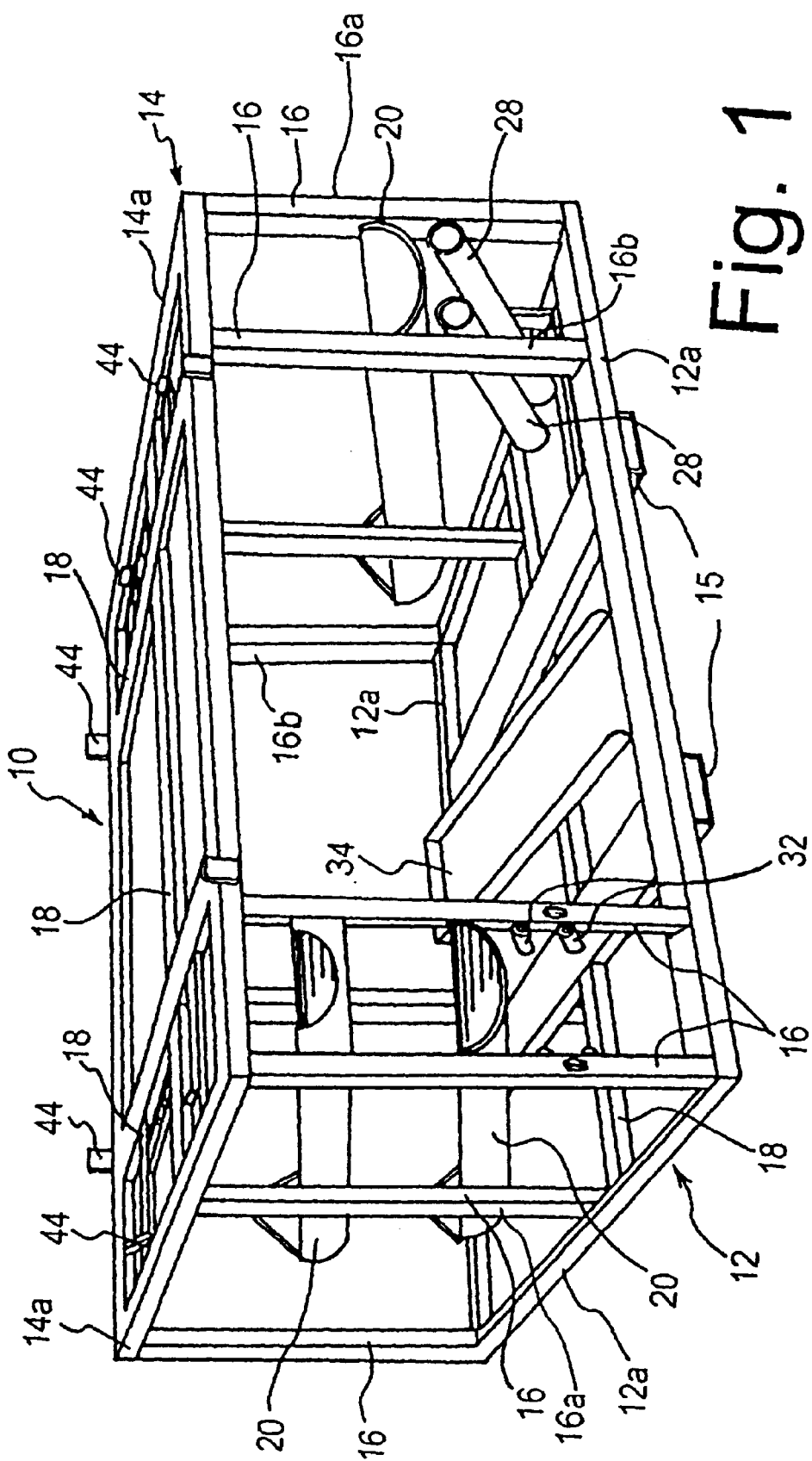
FIG. 1 is a perspective view of a unit according to the present invention for mounting on a trailer.

Referring initially to FIG. 1, a unit 10 for transporting equipment and or implements, includes a generally horizontal lower frame 12 of a rectangular configuration. Frame 12 is made up of a plurality of metal outer frame members 12a. A horizontal upper frame 14 is made up of a plurality of metal outer frame members 14a. The upper and lower frames 12 and 14 are mounted in a spaced apart manner by a plurality of vertical frame members 16 with all of the frame members 12a, 14a and 16 forming a monolithic unit. Depending on the size and weight of the unit and the material of which the unit is constructed of, a pair of supporting beams 15 may also be employed (if required). Conveniently, the frame members comprise hollow steel frame members having a rectangular section. The vertical members define a pair of opposed lateral sides 16a and front and back sides 16b.

The upper and lower frames 12 and 14 each form a platform. Typically, further frame members extending in a longitudinal or transverse direction may be employed to complete each platform. As indicated in FIG. 1, such additional longitudinal and transverse frame members are indicated by a common reference numeral 18, the number and orientation of which will vary depending on the desired configuration for the unit. It will be understood that various modifications and alternatives can be employed to form the upper and lower platforms. The drawings illustrate an open lattice type arrangement; obviously, closed upper and/or lower platforms may be employed or various combinations of partially open and partially closed structures may be employed within the scope of this invention.

One feature of the present invention is that equipment of various sizes and dimensions can be loaded onto the lower platform. To this end, it will be seen from FIG. 1 that access to the interior space between the upper and lower platforms is achieved by providing a large open area between adjacent supporting frame members so that ready access can be had to the lower platform for loading and unloading different types of equipment. Generally speaking, the upper platform does not require any supporting or containing framework other than the frame structure forming the upper platform per se. Thus, in the embodiment shown, all sides of the upper platform are free from extraneous supports so that loading of the upper platform can be carried out from any side.

Figure 4:
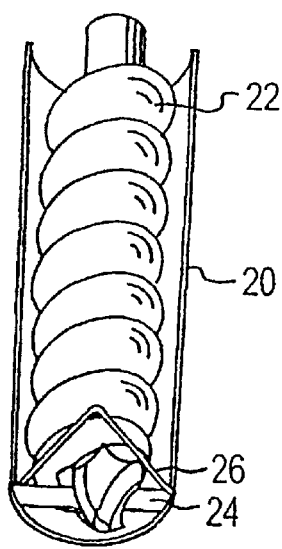
FIG. 4 is a plan view of a typical retaining means for implements which is mounted on or within the unit of FIG. 1.

The portable unit can be designed to carry specific types of implements or tools. For this purpose, the unit may contain retaining means for such implements or tools. As illustrated in FIGS. 1 and 4, retaining means for augers comprise angularly mounted troughs 20 which are secured to adjacent frame members 16 at one or more places by suitable means such as welding, bolts or the like. The angular mounting of the troughs 20, where the troughs are located adjacent the sides of the unit, permits easy loading and discharge of implements retained by the troughs while preventing such implements from being accidentally discharged during transportation of the unit on a trailer. As shown in FIG. 4, the retaining means retaining an auger 22 may include means for positioning the auger on the trough 20 such as a closure member 24 for the trough and/or a wire frame member 26 to prevent the auger from being accidentally discharged from the interior side of the trough.

Figure 5:
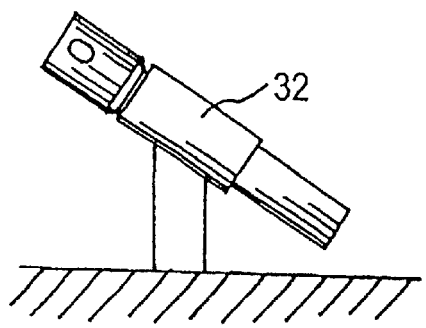
FIG. 5 is a side elevational view of another type of retaining means.
Figure 6:
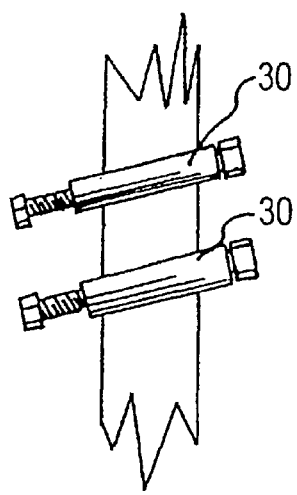
FIG. 6 is a side elevational view showing another type of retaining means otherwise illustrated in FIG. 1.

Other implement retaining members are illustrated in FIGS. 5 and 6, as well as FIG. 1. Different configurations of the retainer members include tubular members 28 for holding rods, brooms, hand tools and the like. The retainer members 28 are angularly mounted and may utilize closed ends to hold the implements. Smaller tubular retainers 30 and 32 (FIGS. 5 and 6) can also be employed. These may retain other types of tools or even pins and bolts.

Returning to FIG. 1, where the trailer mountable unit is adapted to transport implements such as buckets, drills or the like for equipment such as back-hoes, bobcats or the like, the upper and/or lower platforms may include additional retainers such as trough shaped retainer 34 for larger components. The shape and size of these retainers will of course vary depending on the particular implement to be retained.

Figure 2:
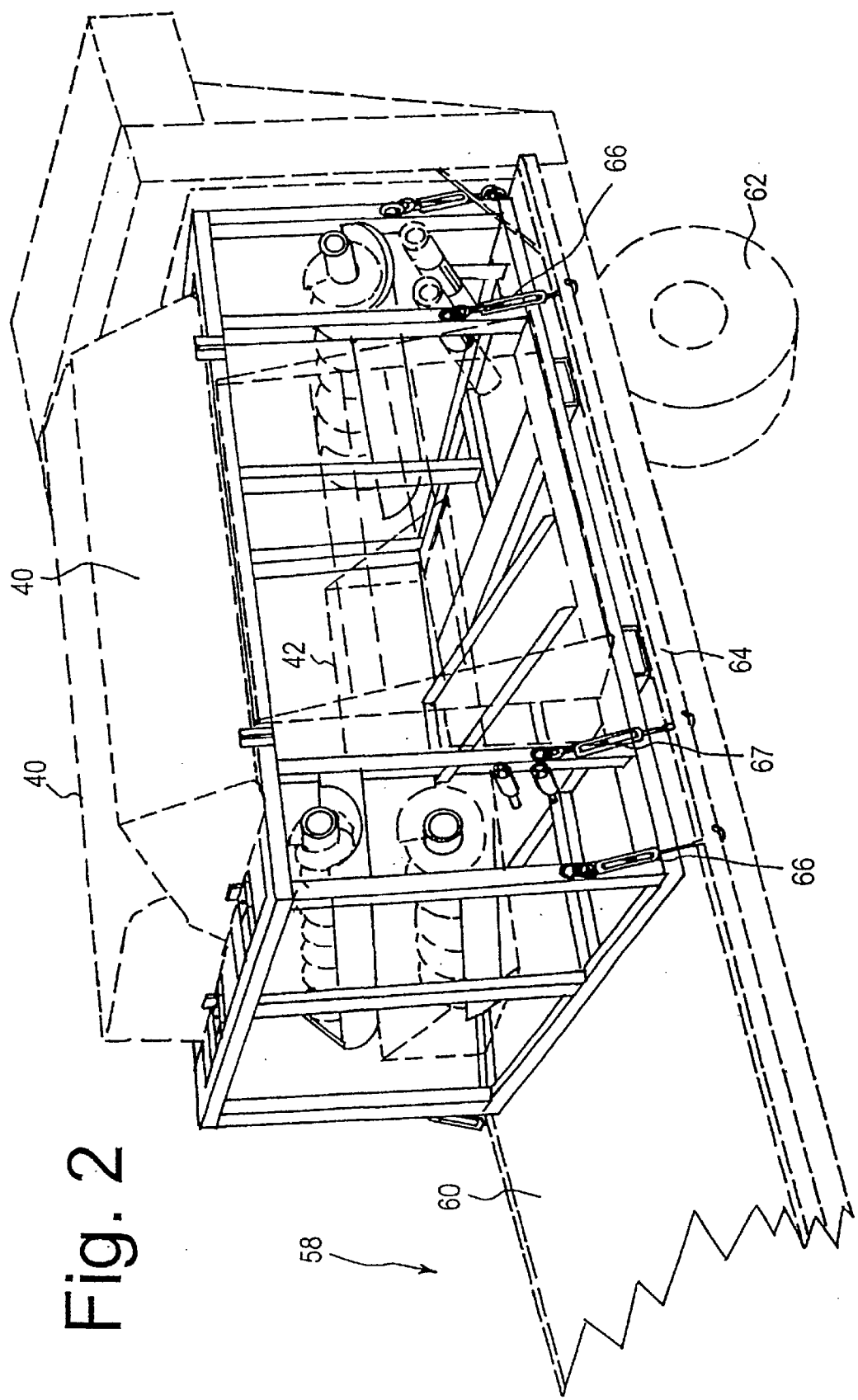
FIG. 2 is a view similar to FIG. 1 but showing the unit having implements (in dotted lines) or accessories mounted on the unit for transportation to a work site.
Figure 3:
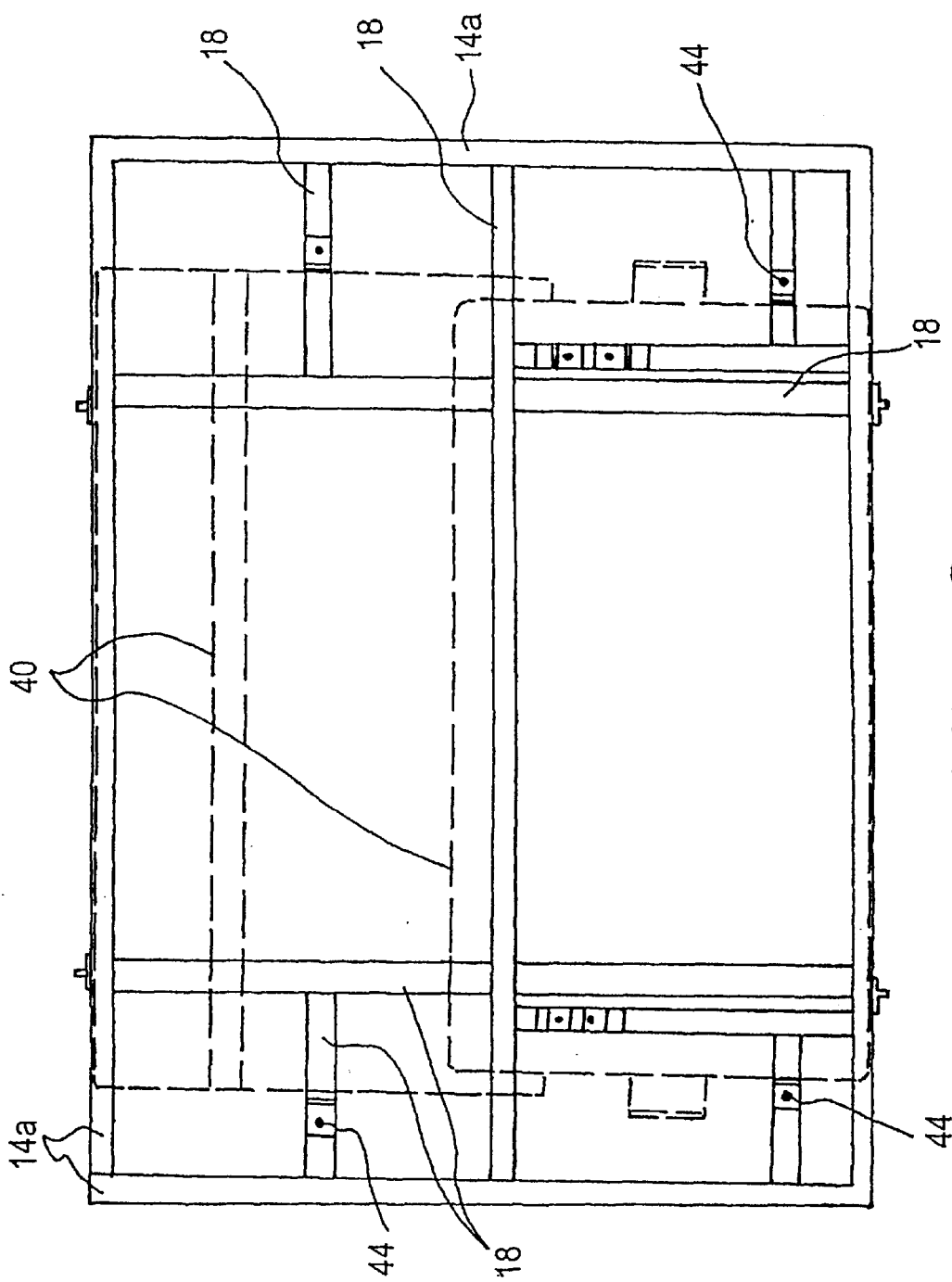
FIG. 3 is a top plan view of the unit of FIG. 2 showing the accessories in dotted lines.

Larger components or implements, such as buckets can be stored both on the lower and upper platforms for transport. The upper platform, as illustrated in FIG. 2, shows mounting of two such buckets indicated by dotted lines 40, while the lower platform mounts a further bucket 42. To position and retain the buckets in place during transport, particularly where the same implements are being transported by the same transportation unit, either fixed or movable stops or holders can be employed. One version of these can be seen from FIGS. 1 and 2 where fixed plates 44 can be secured by welding or the like to the frame members. These plates 44 not only retain the buckets, but also position them on the upper and/or lower platform.

Figure 7:
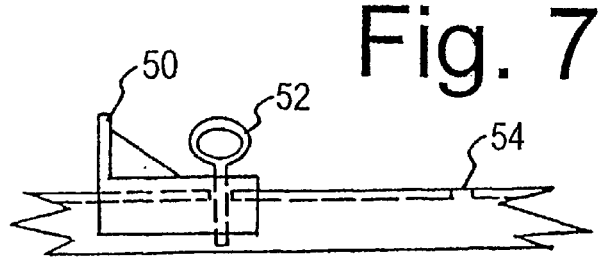
FIG. 7 is a side elevational view of adjustable mounting means for retaining components or implements in place on the platform.
Figure 8:
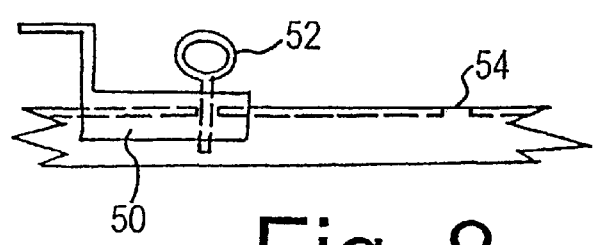
FIG. 8 is a view similar to view 7 but showing another type of adjustable mounting means.

Such stops or holders can also be adjustable as shown in FIGS. 7 and 8. Various types of brackets 50 can be employed which can be positioned at different locations on the platform. Removable pins 52 can be inserted through apertures in the brackets and into holes 54 of the various frame members to provide adjustment.

Referring to FIG. 2, it will be seen that the mobile unit of the present invention can be mounted on a trailer 58. The trailer can be a suitable flatbed trailer having a planar base 60 with wheels 62. Once loaded onto the trailer 58, the unit may be releasably secured to truck bed rails 64 by means of turnbuckle straps or cables 66 or the like. Additional turnbuckle cables or straps 67 fasten fork tines, from a forklift, within the unit 10 via attachment to the rails 64.

Figure 9:
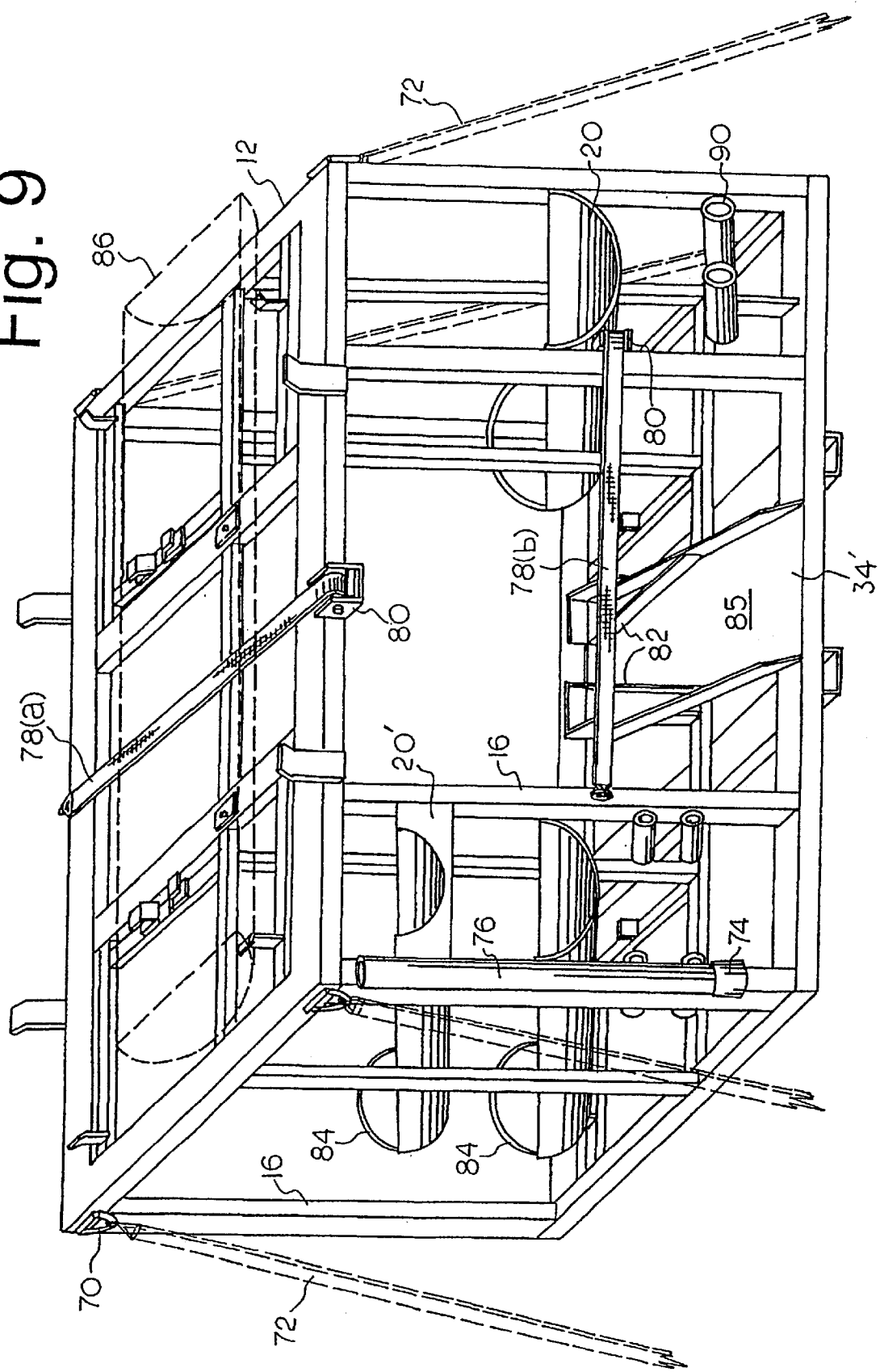
FIG. 9 is a perspective view of a further embodiment of the invention.
Figure 10:
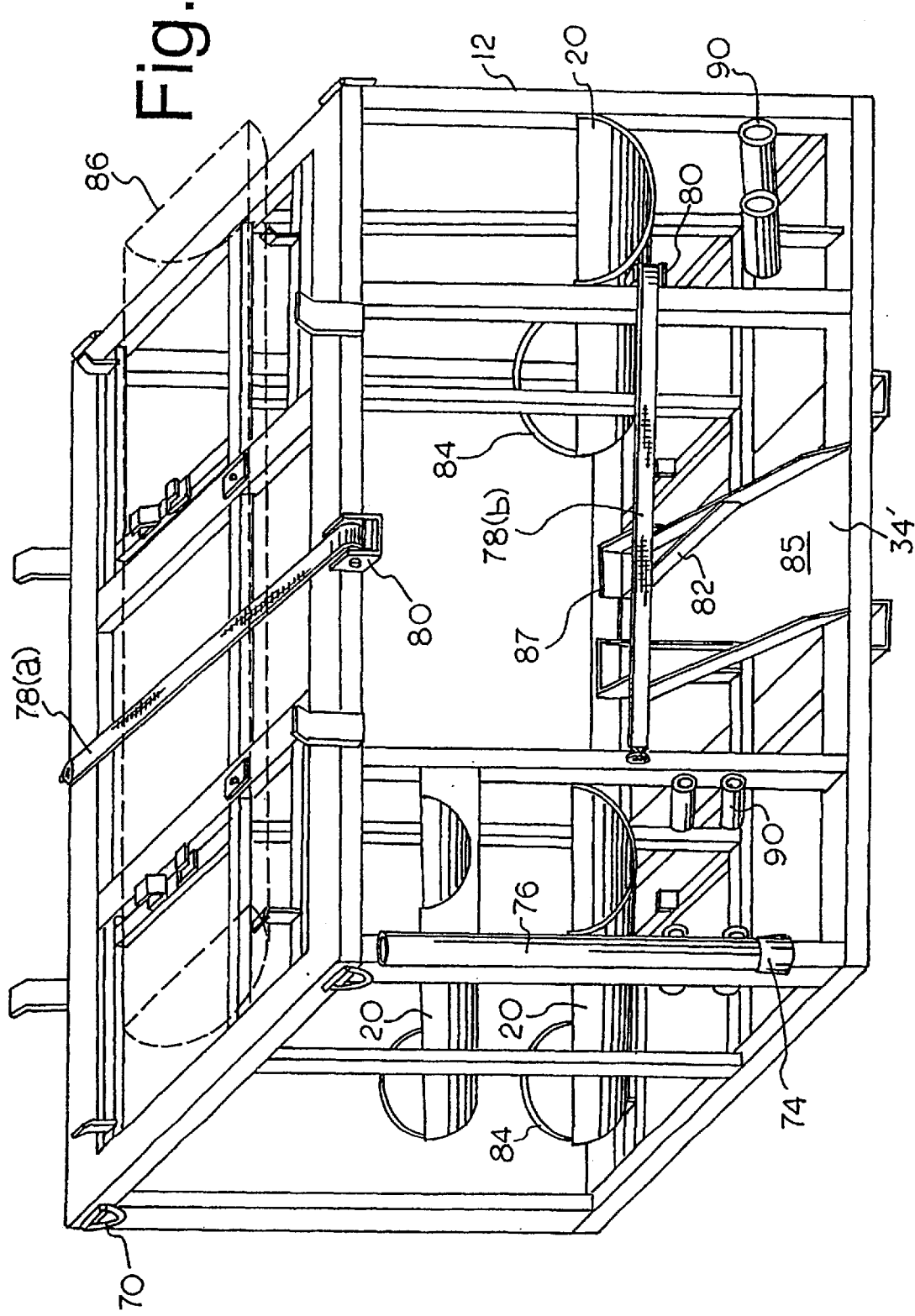
FIG. 10 is a perspective view of the embodiment shown in FIG. 9, with a further implement attachment mounted thereto.

A further embodiment of the invention is illustrated at FIGS. 9 through 11. In this version, the frame 12 has mounted to its upper corners D rings 70, for fastening straps 72 for tying the apparatus to a truck or trailer. A cup-shaped holder 74 welded to one of the vertical supports 16 holds a removable open-ended pipe 76. The pipe-74 pipe 76 comprises a snipe for tightening of load binders for chaining down heavy equipment and machinery to the apparatus. A pair of straps 78 are provided, first strap 78(*a*) spanning the upper deck and a second strap 78(*b*) spanning two vertical members 16. The straps 78(*a*) are tightened by winches 80. The front strap 78(*b*) is for holding large pallet forks in place within the interior of the framework 12. The upper straps 78(*a*) may be used to secure attachments to the top deck.

The embodiment of FIGS. 9 through 11 also includes various modifications to the tool holders. In particular, the lower trough-shaped retainer 34' includes a flat floor 85 and a pair of walls which converge towards the rear end of the retainer. The walls 82 assist in supporting various attachments. Rear walls 87 may extend above the side walls to act as a stop for retained implements. Rear posts 89 elevate the rear end of the retainer 34'.

The U-shaped auger troughs 20' include a modified rear stop member 84, having an inverted U-shape.

A further modification consists of a removable trough 86, shown in dotted lines in FIG. 9 and FIG. 10. The trough 86 has a broad U-shaped cross-sectional profile and is removably bolted to the top deck of the framework 12. The trough 86 is particularly suited for cradling sweeper brushes and snow blades. Tubular members 90 may also be provided for retaining additional implements. These tubular members may have the same configuration as those described above in connection with FIGS. 1, 5 and 6.

A wide variety of implements may be carried by the device, including without limitation skid steer buckets, auger drives, hydraulic jack hammers, padfoot and smoothing vibrating compactors, soil tillers, landscape rakes, bush mowers, sweepr clean up buckets, angle brooms, snow dozer blades, auger bits, auger extensions, pallet forks, tree spades and various hand tools.

What is claimed is:

1. A one piece transportation unit adapted for mounting on a conventional trailer bed to permit transportation of equipment and implements, characterized by the unit comprising:

a monolithic frame having spaced apart upper and lower equipment mounting surfaces;

said frame having pairs of opposed sides, one of said pairs of sides defining lateral sides for said unit, another one of said pairs of sides forming front and back sides;

said frame having supporting members for positioning said upper surface in a spaced apart relationship relative to said lower surface;

at least one side of said pairs of sides having an access opening between said upper and lower surfaces to permit loading of equipment onto said upper or lower surfaces; and a plurality of spaced apart implement retainers mounted by said frame for releasably retaining separate implements, said implement retainers each having front and rear ends, said front end being open to a lateral side of said frame, said retainers being mounted to angle rearwardly downwardly and comprising a floor and a rear stop member for retaining implements during transport.

2. An apparatus as defined in claim 1, wherein said upper surface has substantially open lateral sides whereby transportable apparatus may be loaded on at least said upper surface.

3. An apparatus as defined in any of claims 1 through 2, wherein said unit includes means for releasably securing said unit to a trailer.

4. An apparatus as defined in claim 1, wherein at least one of said equipment mounting surfaces comprises a plurality of horizontal longitudinal and transverse frame members forming an upper open supporting surface.

* * * * *